United States Patent
Russ et al.

(10) Patent No.: US 6,553,962 B1
(45) Date of Patent: Apr. 29, 2003

(54) EXHAUST VALVE DEACTIVATION AND INTAKE VALVE PHASING TO ENABLE DECELERATION FUEL SHUT OFF AND ENGINE BRAKING

(75) Inventors: Stephen George Russ, Canton, MI (US); Robert Albert Stein, Saline, MI (US); William Francis Stockhausen, Northville, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 260 days.

(21) Appl. No.: 09/630,472

(22) Filed: Aug. 2, 2000

(51) Int. Cl.$^7$ ............................................... F02D 13/04
(52) U.S. Cl. ............................................... 123/322
(58) Field of Search ................................ 123/321, 322

(56) References Cited

U.S. PATENT DOCUMENTS

| | | | |
|---|---|---|---|
| 4,033,304 A | 7/1977 | Luria | 123/78 A |
| 4,592,319 A * | 6/1986 | Meistrick | 123/321 |
| 5,377,631 A | 1/1995 | Schechter | 123/198 F |
| 5,642,703 A | 7/1997 | Stockhausen et al. | 123/198 F |
| 5,975,052 A | 11/1999 | Moyer | 123/406.23 |
| 6,161,521 A * | 12/2000 | Russ et al. | 123/324 |

* cited by examiner

Primary Examiner—Andrew M. Dolinar
(74) Attorney, Agent, or Firm—Carlos Hanze

(57) ABSTRACT

An automotive internal engine 8 is provided which includes an engine controller 70 cognizant of a desired deceleration condition for a vehicle and a combustion chamber 12 with a reciprocating piston 15 mounted therein. The piston has a top dead center and a bottom dead center position. A cam driven exhaust valve 14 is provided which can be selectively disabled to a closed position to deactivate the combustion chamber 12 in response to a signal given by the engine controller 70. A variable phase cam driven intake poppet valve 16 responsive to a signal given by the engine controller 70 is provided to selectively set the opening and closing operation of the intake poppet valve 16 to be generally symmetrical about one of the center positions during the first combustion chamber 12 deactivation during vehicle deceleration.

20 Claims, 6 Drawing Sheets

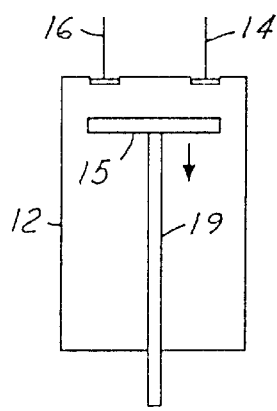 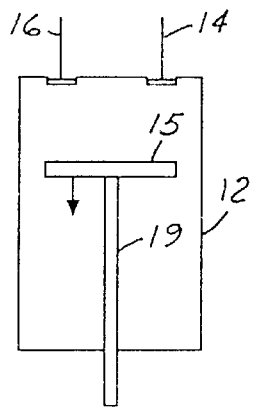 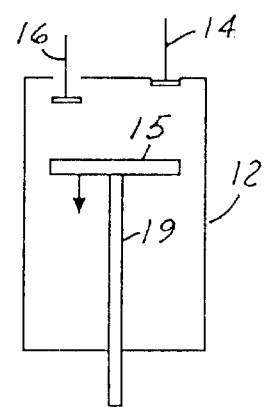 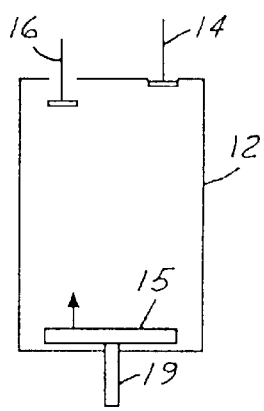
FIG.5A  FIG.5B  FIG.5C  FIG.5D
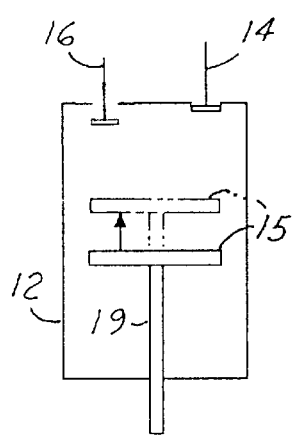 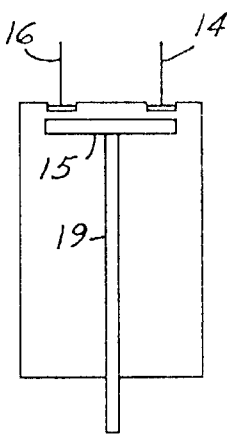 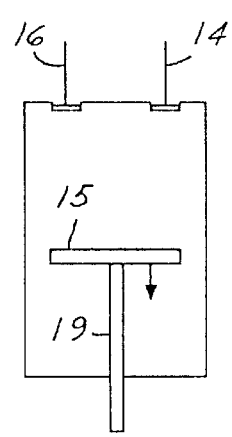 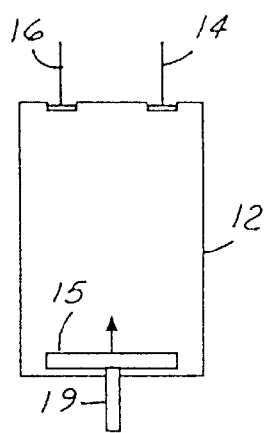
FIG.5E  FIG.5F  FIG.5G  FIG.5H

EXHAUST VALVE DEACTIVATION AND INTAKE VALVE PHASING TO ENABLE DECELERATION FUEL SHUT OFF AND ENGINE BRAKING

FIELD OF THE INVENTION

The field of the present invention is that of automotive engines, in particularly automotive engines having deceleration fuel shut off.

BACKGROUND OF THE INVENTION

Deceleration fuel shut off (DFSO) can lead up to four percent fuel savings on the combined Federal Test Procedure cycle. Even greater fuel savings are possible with drive cycles which include more deceleration time. However, in the past there have been particular technical problems in implementing DFSO. One of the problems in implementing DFSO is transient fuel behavior in the intake system. Transient fuel behavior can be alleviated with direct in-cylinder fuel injection or more advanced port fuel injection systems with less wall wetting. A second problem in implementing DFSO is the more intense vehicle deceleration due to increased braking by the engine. The problem of increased braking by the engine can be resolved by increased driver acclimation and by acknowledgement of the benefit of less stress and wear upon the vehicle braking system. The third issue and the hardest technical challenge to overcome is the issue of excessive air being pumped to the engine exhaust system. Excessive air causes cooling and oxygen loading of the exhaust system catalyst under normal DFSO conditions.

It is desirable to provide an internal combustion engine and a method of operation thereof which allows DFSO. It is also desirable to provide an arrangement of an internal combustion engine and a method of operation thereof which allows DFSO without causing cooling or excessive oxygen loading of the vehicle catalyst in order to avoid degrading the NOx conversion efficiency of the catalyst upon subsequent engine operation. It is further desirable to provide an internal combustion engine and a method of operation thereof with the above-noted features which can also be utilized to provide engine braking when high levels of vehicle deceleration are desired.

SUMMARY OF THE INVENTION

To make manifest the above-delineated and other desires the revelation of the present invention is brought forth. In the arrangement of the internal combustion engine of the present invention, the intake event of the cylindrical combustion chamber intake poppet valves is phased to be symmetric about the top dead center (phase advanced) or preferably the bottom dead center (phase retarded) position. Equal amounts of airflow are pulled into the combustion chamber via the intake valve opening during the intake stroke and expelled through the intake valve opening from the combustion chamber during the first part of the compression stroke minimizing pumping work. The exhaust poppet valve is deactivated. Accordingly, during this period of deceleration, the fuel can be shut off from the vehicle. If additional braking is required, the intake cam can be advanced to standard timing. The advancement of the intake cam to standard timing increases pumping work and engine braking.

It is a feature of the present invention to provide a four-cycle internal combustion engine arrangement that has DFSO by disabling the exhaust valve on the deactivated cylinder(s) to a closed position and phase varying the operation of the intake poppet valve.

The above noted object and other features of the present invention will become better known to one skilled in the art from a review of the accompanying drawings and detailed description of the invention.

BRIEF DESCRIPTION OF THE DRAWINGS

FIGS. 5A through 5H are schematic views illustrating the operation of the intake and outlet poppet valves during the deactivated stage of operation of a cylinder in the internal combustion engine arrangement according to the present invention.

DETAILED DESCRIPTION OF THE DRAWINGS

Figure 1:
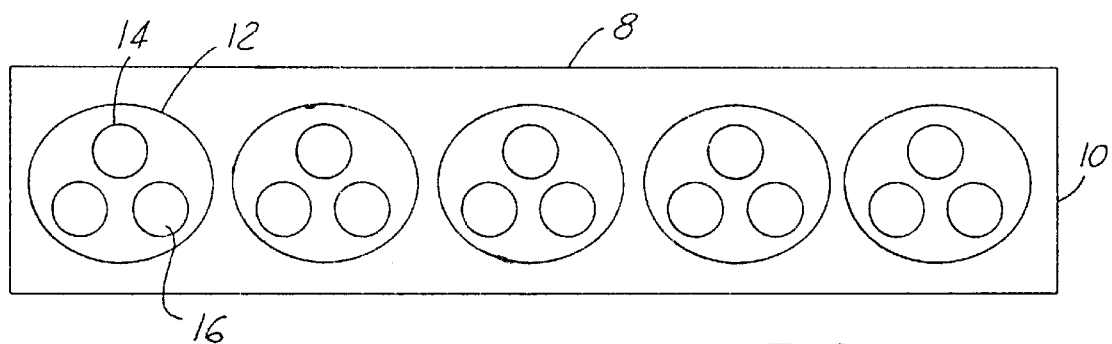
FIG. 1 is a schematic view of a single bank of deactivatable cylinder combusion chambers in a V-10 internal combustion engine built and operated according to the principles of the present invention wherein each cylinder has a single exhaust and dual intake poppet valves.

Referring to FIGS. 1-7, a four-cycle internal combustion engine arrangement 8 built and operated according to the present invention has a bank of cylindrical combustion chambers 12 which are presented in a V-formation. Each combustion chamber 12 has a reciprocating piston 15 slidably mounted therein. In a conventional manner, the piston 15 is pivotally connected with a piston rod 19 which is in turn pivotally connected on an engine crankshaft (not shown).

Figures 6, 7:
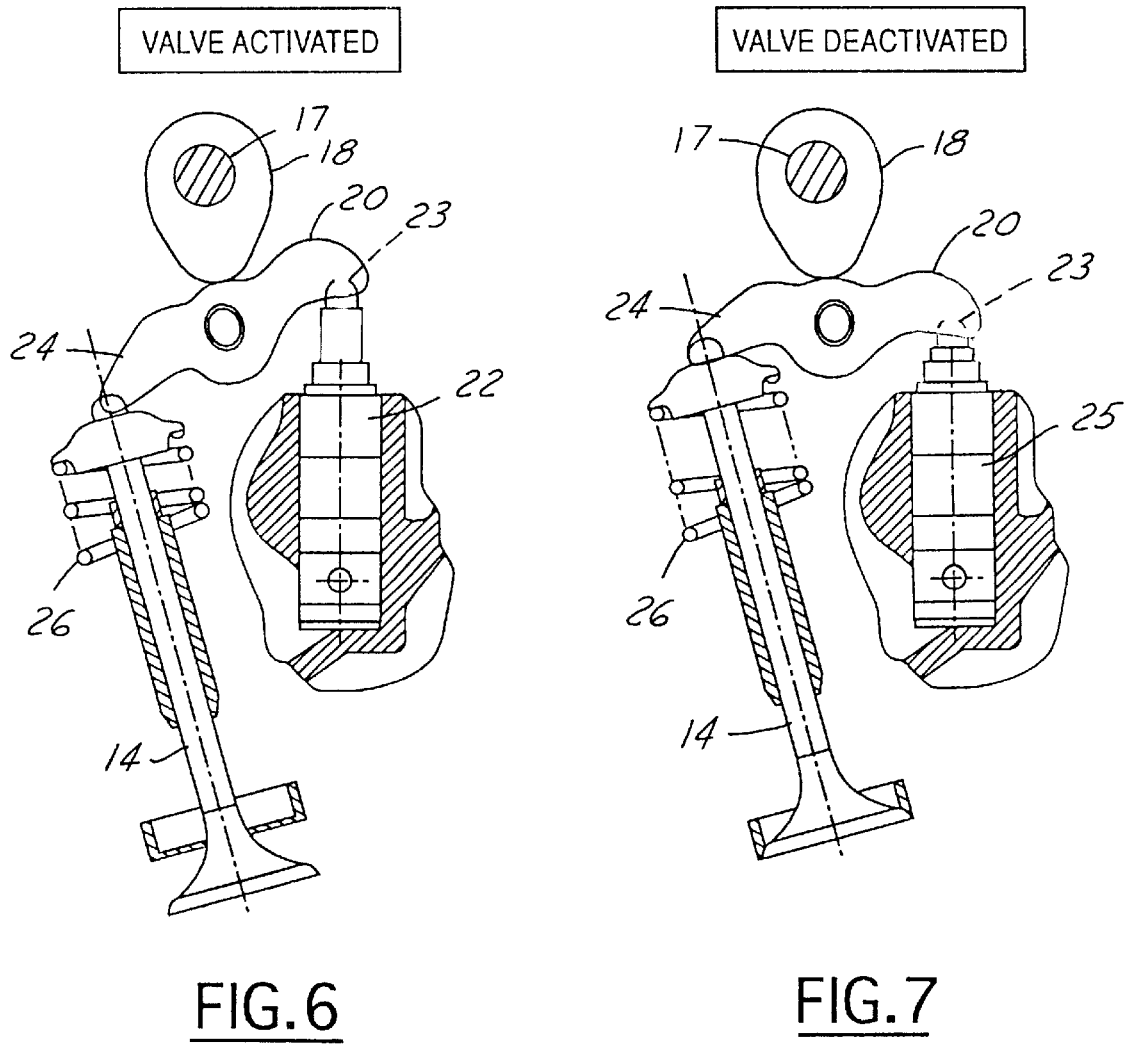
FIGS. 6 and 7 give an example of a poppet valve disablement which can be utilized on the exhaust valve in an internal combustion engine arrangement of the present invention.

Each combustion chamber 12 has a single exhaust poppet valve 14 and two intake poppet valves 16. The exhaust poppet valves 14 are driven by a phase variable camshaft 17 (FIGS. 6 and 7). The camshaft 17 has connected thereto a series of cams 18 (only one shown). Each of the cams 18 contacts a rocker arm 20. The rocker arm 20 (associated with an exhaust valve 14 of one of the deactivatable combustion chambers 12), on one end pivots on a fulcrum 23. The fulcrum 23 is provided by the end of a hydraulic valve lifter 22. An opposite end 24 of the rocker arm 20 pushes a top end of the exhaust valve 14 downward to open the exhaust valve 14 when the cam 18 is at the position shown. When the cam 18 is rotated from its extreme radially outward position to a side position (not shown), a spring 26 in a conventional manner closes the exhaust valve 14. To deactivate the exhaust valve 14, fluid is removed from under the piston 15. The exhaust valve 14 is then moved by spring 26 biased vertically upward to its closed position.

Referring to FIGS. 2A, 4, 5 and 8, an engine controller under the appropriate desired vehicle load conditions will signal for a deactivation of the cylinders 12. For each deactivated cylinder 12, valve lifter 22 will be signaled to move the fulcrum 23 down to disable the exhaust valve 14.

Figure 4:
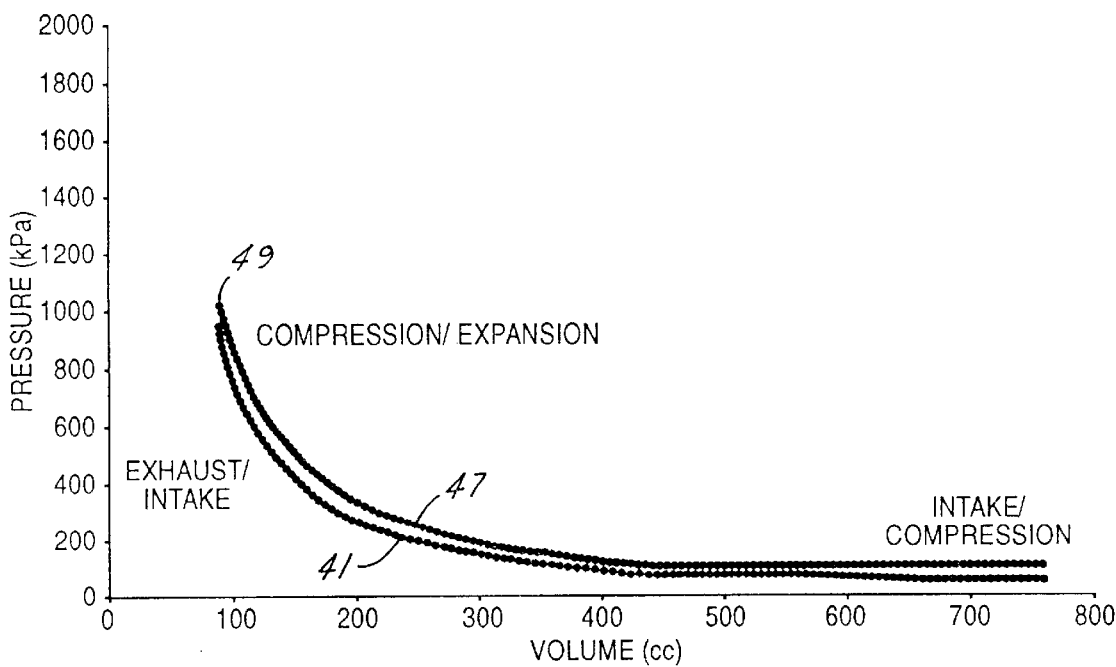

Referring in particular to FIGS. 2A and 5A–5H intake valves 16 are operated by a phase retardable cam. Typically the cam can be on the same camshaft 17 which drives the exhaust valve 14. The camshaft 17 and associated cams are retarded by a cam phaser such as a helical spline cam phaser found on the Ford Motor Company 2.0L 1998 Escort engine. The retardation will be between 60 and 70 degrees and is preferably 65 degrees and is symmetric about the bottom dead center position 45 of the piston (FIG. 2). In FIG. 5A, the exhaust valve 14 has been disabled to its closed position. The intake stroke of the piston 15 is beginning. In normal operation the intake valve 16 opens during the very last stages of the exhaust stroke of the piston 15. In FIG. 5B, the piston 15 has moved downward. As shown in FIG. 5B, the intake valve 16 is still closed during the initial intake stroke. The initial valve opening (IVO) of valve 16 is shown in FIG. 5C and, in FIG. 2A at point 41 is approximately 60 to 70 degrees and preferably 65 degrees from the normal initial valve opening point 43 which is 10 to 15 degrees from the top dead center position of the piston 15. Referring to FIG. 4, the IVO will take place at approximately 55 crank angle degrees after top dead center at point 41. At the piston 15 bottom dead center position 45, shown in FIGS. 2 and 5D, the intake valve 16 is still open. At the position of the piston 15 in FIG. 5E, during the compression stroke the intake valve 16 remains open at the position shown in FIG. 5E and only closes at the phantom position shown in FIG. 5E approximately 55 crank angle degrees before top dead center. From the position shown in phantom in FIG. 5E, and FIG. 4 at initial valve closing (IVC) at 47, the intake valve 16 is closed. Referring to FIG. 4, the entrapped gas is compressed during the remainder of the compression stroke until the piston 15 reaches the top dead center position shown in FIG. 5F. Following the top dead center position, the piston 15 moves downward. As shown in FIG. 5G, during the expansion stroke both the intake valve 16 and the exhaust valve 14 are closed and any remaining gas within the cylinder will be expanded. As shown in FIG. 5H, the compression stroke will work to compress the entrapped air, which acts as a spring and again will be compressed during the exhaust stroke. The improvement brought about by the present invention is shown in the diagram of FIG. 4 over the pressure volume diagram of FIG. 3. Due to the retardation of the intake valve 16 the volume of air pumped into the cylinder 12 is lessened.

Figure 2A:
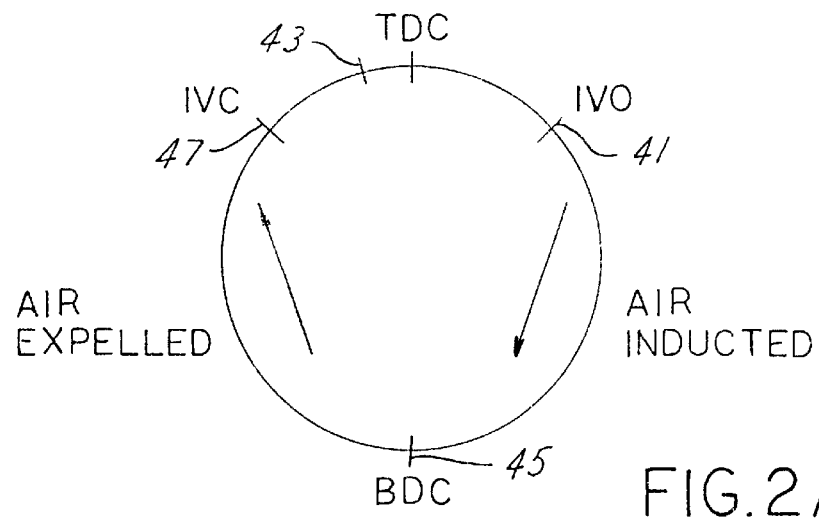
FIG. 2A is a schematic view illustrating opening and closing timing of the intake poppet valves in the internal combustion engine with the deactivatable combustion chambers as shown in FIG. 1 wherein the opening and closing of the intake poppet valves for a deactivated cylinder are retarded to be generally symmetric about a bottom dead center position of an engine piston.
Figure 2B:
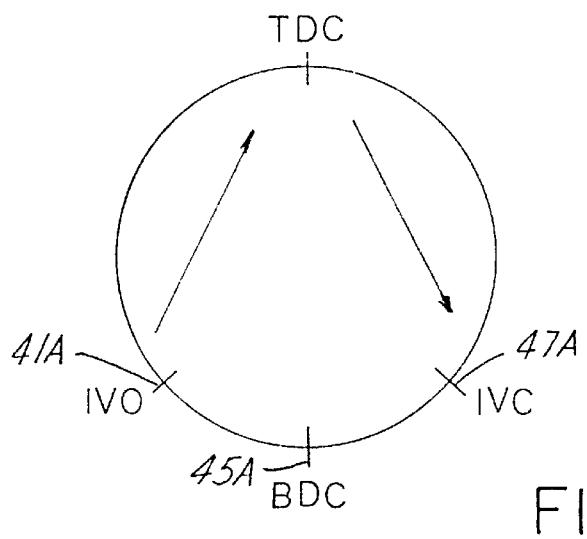
FIG. 2B is a schematic view illustrating opening and closing timing of the intake poppet valves in the internal combustion engine with the deactivatable combustion chambers as shown in FIG. 1, wherein the opening and closing of the intake poppet valves for a deactivated cylinder are advanced to be generally symmetric about a top dead center position of an engine piston.
Figure 3:
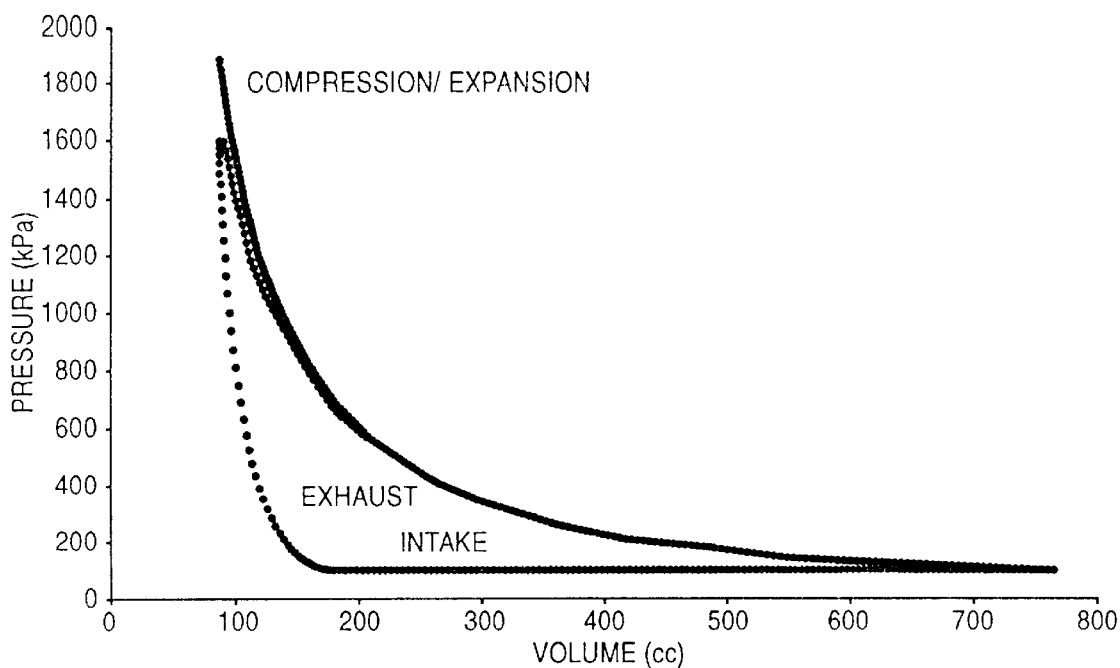
FIG. 3 is a pressure volume diagram illustrating work of a deactivated cylindrical combustion chamber which has a disabled exhaust poppet valve and a normal phase operating intake poppet valve inlet.

FIG. 2B illustrates an alternate embodiment of the present invention. The engine arrangement shown in FIG. 2B is identical to that described with limited exception. In the alternative embodiment presented by FIG. 2B, the IVO 41A and the IVC 47A are symmetrical about the top dead center position of the piston. In a manner as previously described, the exhaust poppet valve 14 is disabled. The engine arrangement and method of FIG. 2B requires a greater clearance between the top dead center position of the piston 15 and the top of the combustion chamber 12 since the intake valve 16 is open when the piston 15 is at the top dead center position.

Figure 8:
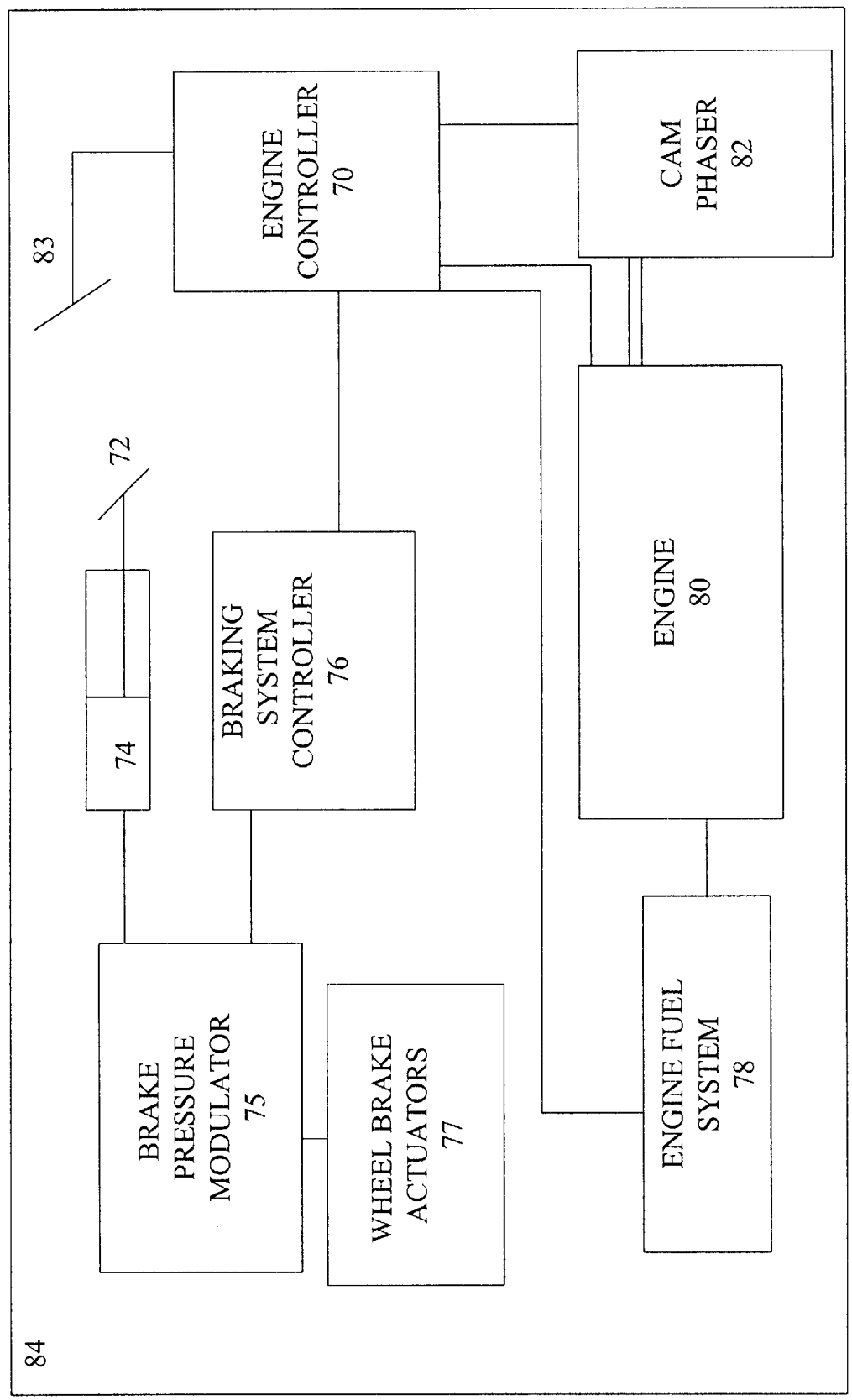
FIG. 8 is a schematic view of the operation of an engine controller internal combustion engine of the present invention.
Figure 9:
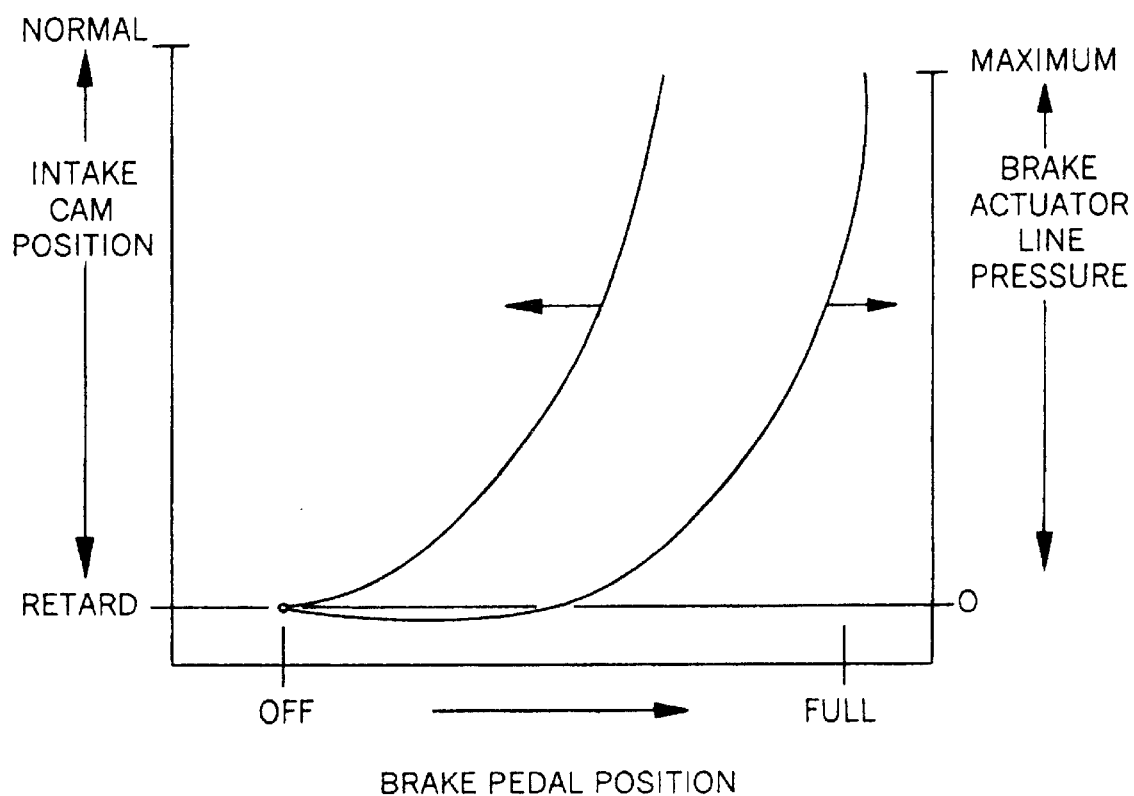
FIG. 9 is a chart illustrating a function relationship of brake system pressure and cam phase operation when utilizing the present inventive internal combustion engine to brake a vehicle.

Referring to FIGS. 8 and 9, in operation the engine controller 70 has several inputs. The engine controller 70 is cognizant of the condition of the vehicle brake system by monitoring brake pedal 72 position, master cylinder 74 pressure or other brake system operational parameters from the braking system controller 16. The engine controller 70 is also connected with the engine fuel system 78, the engine block 80, the intake cam phaser 82, and with a positional input from the accelerator pedal 83. From the aforementioned inputs and other inputs, the engine controller will be cognizant of a desired deceleration of the vehicle the engine is powering 84. Under appropriate conditions, when a desired deceleration event occurs, the engine controller 70 will signal the cam phaser to phase the intake poppet valve cam operation to be symmetric, preferably about the bottom center position. The exhaust poppet valve 14 will be signaled to the closed position. Contemporaneously, the engine controller 70 will signal the engine fuel system 78 to go to a deceleration fuel shut-off mode of operation. As a higher level of braking operation is demanded, the engine controller 70 first will signal the cam phaser 82 to return the intake valve cam operation to its normal operation to allow the engine 80 to brake the vehicle 84. As additional braking force is desired, the braking system controller 76 allows the brake line pressure (in part determined by the brake pressure modulator 75) to the wheel actuators 77 to increase. This mode of operation is especially beneficial when the present invention is used in large vehicles and/or trucks.

FIG. 9 illustrates a relationship between brake pedal position, brake actuator line pressure, and desired intake cam position for the embodiment of the present invention having cam retard and valve operation symmetric about the bottom dead center position.

The present inventive engine arrangement and method of operation have been shown in several preferred embodiments. However, it will be apparent to those skilled in the art that various modifications can be made to the present invention without departing from the spirit and scope of the invention as described herein and as encompassed by the following claims.

We claim:

1. An arrangement of a four-cycle internal combustion engine for an automotive vehicle comprising:
    an engine controller cognizant of a desired deceleration condition for a vehicle said engine is powering; and
    at least a first combustion chamber with a reciprocating piston mounted therein, said piston having a top dead center and a bottom dead center position, said first combustion chamber having a cam driven exhaust poppet valve which can be selectively disabled to a closed position to deactivate said first combustion chamber in response to a signal given by said engine controller, said first combustion chamber also having a variable phase cam driven intake poppet valve responsive to a signal given by said engine controller to selectively set the opening and closing operation of said intake poppet valve to be generally symmetrically about one of said center positions during said first combustion chamber deactivation during said vehicle deceleration.

2. An arrangement of an internal combustion engine as described in claim 1, wherein said selective set of said opening of said intake poppet valve is approximately 60 to 70 degrees from said top dead center position of said piston during said deactivation of said first combustion chamber.

3. An arrangement of an internal combustion engine as described in claim 2, wherein said selective set of said first combustion chamber intake valve is approximately 65 degrees from top dead center position of said piston.

4. An internal combustion engine as described in claim 1, wherein said opening and closing operation of said intake poppet valve for said first cylinder, when said first combustion chamber is deactivated is generally symmetric about said bottom dead center position of said reciprocating piston within said first combustion chamber.

5. An arrangement of an internal combustion engine as described in claim 1, wherein said first combustion chamber has one exhaust poppet valve and multiple intake poppet valves and said intake poppet valves are driven by a common cam shaft.

6. An arrangement of an internal combustion engine as described in claim 5, wherein said common camshaft drives cams for said intake and exhaust valves for said first combustion chamber.

7. An arrangement of an internal combustion engine as described in claim 1, wherein said engine controller is cognizant of a varied level of desired deceleration of said vehicle, and said engine controller varies the phase of operation of said cam toward a normal operation to cause said engine to brake said vehicle upon a predetermined level of desired deceleration of said vehicle.

8. An arrangement of an internal combustion engine as described in claim 7, wherein said engine controller is cognizant of the operation of said vehicle braking system in determining said level of desired deceleration of said vehicle.

9. A method of operating a four-cycle internal combustion engine having at least one combustion chamber with a reciprocating piston with cam driven intake and exhaust poppet valves, said piston having a top dead center position and a bottom dead center position, said method including selective deactivation of at least one of said combustion chamber during a desired deceleration event of said vehicle said engine is powering, said method including:

disabling said cam driven exhaust poppet valve for said deactivated combustion chamber; and varying a phase of operation of said cam driving said deactivated combustion chamber intake poppet valve opening and closing to be generally symmetrical about one of said piston center positions.

10. A method of operating an internal combustion engine as described in claim 9, wherein said operation of said intake poppet valve for said deactivated combustion chamber is generally symmetrical about said bottom dead center position of said piston.

11. A method of operating an internal combustion engine as described in claim 10, wherein said opening operation of said intake poppet valve is approximately 60 to 70 degrees from said top dead center position of said pistons during the deactivation of said combustion chamber.

12. A method of operating an internal combustion engine as described in claim 11, wherein said opening of said deactivated combustion chamber intake poppet valve is approximately 65 degrees from said top dead center position of said piston.

13. A method of operating an internal combustion engine as described in claim 9, wherein a plurality of said deactivatable combustion chamber has one exhaust poppet valve and multiple intake poppet valves and said intake and exhaust poppet valves are driven by a common cam shaft.

14. A method of operating an internal combustion engine as described in claim 9, wherein the phase of operation of said cam driving said deactivated combustion chamber intake poppet valve opening and closing is returned from a position generally symmetrical about one of said piston centered position toward a phase position of normal operation to cause said engine to brake said vehicle in response to a level of desired deceleration of said vehicle.

15. A method of operating an internal combustion engine as described in claim 14, wherein said returning of the operation of said cam driving said deactivated cylinder combustion chamber intake poppet valve opening and closing is operated in response to a condition of operation of a braking system of said vehicle.

16. An arrangement of a four-cycle internal combustion engine comprising:

an engine controller cognizant of a variable desired deceleration condition for a vehicle said engine is powering;

a plurality of combustion chambers, each said chamber having an exhaust poppet valve and an intake poppet valve, said pistons having a top dead center position and a bottom dead center position; and each of said combustion chambers having an exhaust poppet valve which can be selectively disabled to a closed position to deactivate said combustion chambers, said combustion chambers also having variable phase retardable cam driven intake poppet valves to retard the opening and closing operation of said intake poppet valves to be generally symmetrical about a bottom dead center position of said reciprocating pistons during said combustion chamber deactivation during said vehicle deceleration at one desired level and to return the opening and closing operation of said intake poppet valves a normal operational phase to cause said engine to brake said vehicle at a second desired level of deceleration of said vehicle.

17. An arrangement of an internal combustion engine as described in claim 16, wherein said controller is cognizant of an operational condition of a braking system of said vehicle to determine a level of desired deceleration of said vehicle.

18. An arrangement of an automotive vehicle comprising a four-cycle internal combustion engine, said engine including:

an engine controller cognizant of a desired deceleration condition for said vehicle; and at least a first combustion chamber with a reciprocating piston mounted therein, said piston having a top dead center and a bottom dead center position, said first combustion chamber having a cam driven exhaust poppet valve which can be selectively disabled to a closed position to deactivate said first combustion chamber in response to a signal given by said engine controller, said first combustion chamber also having a variable phase cam driven intake poppet valve responsive to a signal given by said engine controller to selectively set the opening and closing operation of said intake poppet valve to be generally symmetrically about one of said center positions during said first combustion chamber deactivation during said vehicle deceleration.

19. A vehicle as described in claim 18 wherein said engine controller is cognizant of a variable level of desired deceleration of said vehicle and said engine controller can signal said cam phaser to return toward normal operation to cause said engine to brake said vehicle.

20. A vehicle as described in claim 19 wherein said engine controller is cognizant of an operational condition of a braking system of said vehicle to determine a level of desired deceleration of said vehicle.

* * * * *